US011150893B2

(12) United States Patent
Sabath et al.

(10) Patent No.: US 11,150,893 B2
(45) Date of Patent: Oct. 19, 2021

(54) COLLABORATIVE SOFTWARE DEVELOPMENT TOOL FOR RESOLVING POTENTIAL CODE-CHANGE CONFLICTS IN REAL TIME

(71) Applicant: INTERNATIONAL BUSINESS MACHINES CORPORATION, Armonk, NY (US)

(72) Inventors: Mariusz Sabath, Ridgefield, CT (US); Ali Kanso, Elmsford, NY (US); Michael Joseph Spreitzer, Croton-On-Hudson, NY (US); Hai Huang, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/296,727

(22) Filed: Mar. 8, 2019

(65) Prior Publication Data
US 2020/0285462 A1    Sep. 10, 2020

(51) Int. Cl.
*G06F 8/71* (2018.01)
*G06F 8/33* (2018.01)

(52) U.S. Cl.
CPC . *G06F 8/71* (2013.01); *G06F 8/33* (2013.01)

(58) Field of Classification Search
CPC .................................... G06F 8/71; G06F 8/33
See application file for complete search history.

(56) References Cited

U.S. PATENT DOCUMENTS

| 7,043,529 | B1 | 5/2006 | Simonoff |
| 9,858,070 | B2 | 1/2018 | Deluca et al. |
| 2007/0282657 | A1 | 12/2007 | Hupfer et al. |
| 2008/0216056 | A1 | 9/2008 | Bate et al. |
| 2009/0276752 | A1 | 11/2009 | Sharma |

(Continued)

FOREIGN PATENT DOCUMENTS

GB    2457552 A    8/2009

OTHER PUBLICATIONS

Rohan Padhye, Senthil Mani, and Vibha Singhal Sinha, "NeedFeed: taming change notifications by modeling code relevance," ASE '14 Proceedings of the 29th ACM/IEEE international conference on Automated software engineering, pp. 665-676.

(Continued)

*Primary Examiner* — Wei Y Zhen
*Assistant Examiner* — Amir Soltanzadeh
(74) *Attorney, Agent, or Firm* — Cantor Colburn LLP; Abdy Raissinia

(57) ABSTRACT

According to one or more embodiments of the present invention, a computer-implemented method includes uploading, by a first instance of an integrated development environment (IDE), a first source-code change to a change log of a version control system. A second instance of the IDE is used to upload a second source-code change to the change log of the version control system. A determination is made that the second source-code change conflicts with the first source-code change. Based on the determination that the second source-code change conflicts with the first source-code change, generating a notification of the second source-code change is generated in the first instance of the IDE.

20 Claims, 7 Drawing Sheets

(56) References Cited

U.S. PATENT DOCUMENTS

| | | | | |
|---|---|---|---|---|
| 2013/0055233 A1* | 2/2013 | Hatton | ............... | G06F 8/71 |
| | | | | 717/170 |
| 2015/0040101 A1* | 2/2015 | Rummler | ............ | G06Q 10/101 |
| | | | | 717/113 |
| 2015/0082281 A1* | 3/2015 | Koenig | ............... | G06F 11/3668 |
| | | | | 717/124 |
| 2015/0106790 A1* | 4/2015 | Bigwood | ............ | G06F 11/3624 |
| | | | | 717/127 |
| 2017/0123963 A1* | 5/2017 | Koren | ................. | G06F 11/3668 |
| 2019/0250780 A1* | 8/2019 | Feng | .................... | G06Q 10/101 |

OTHER PUBLICATIONS

Yuriy Brun, Reid Holmes, Michael D. Ernst, and David Notkin, "Crystal: precise and unobtrusive conflict warnings," ESEC/FSE '11 Proceedings of the 19th ACM SIGSOFT symposium and the 13th European conference on Foundations of software engineering, pp. 444-447.

Yuriy Brun, Reid Holmes, Michael D. Ernst, and David Notkin, "Proactive detection of collaboration conflicts," ESEC/FSE '11 Proceedings of the 19th ACM SIGSOFT symposium and the 13th European conference on Foundations of software engineering, pp. 168-178.

* cited by examiner

```
1  import random
2
3  # define a python function
4  def print_factors(x):
5      This function takes a number and prints the factors of that number
6
7      printf("The factors of", x, "are:")
8      for i in range(1, x+1):
9          if x % i == 0:
10             print(i)
11
12 # Choosing a random value using the random library
13 num = random.randint(1, 101)
14
15 if __name__ == "__main__":
16     print_factors(num)
```

400

FIG. 4

# COLLABORATIVE SOFTWARE DEVELOPMENT TOOL FOR RESOLVING POTENTIAL CODE-CHANGE CONFLICTS IN REAL TIME

BACKGROUND

The present invention generally relates to computer technology, and more specifically, to a multi-user, collaborative software development tool configured to resolve potential code-change conflicts in real time, i.e., before committing the code change(s) to a central repository.

In general, integrated development environments (IDEs) are powerful programming toolkits that integrate editors, wizards, compilers, debuggers, and other tools, which enable software developers to build complex programs and applications. Conventional IDE systems and programming toolkits can employ functions and other resources to assist developers in designing and implementing application code.

It is typical for multiple software developers to collaborate on the development of a given set of computer software code (e.g., program, code, file, etc.). At times, the developers can be at different geographic locations. Commercially available software tools, known generally as version control systems (VCS), have been developed to facilitate the collaboration among multiple software developers working to develop a given source-code.

SUMMARY

Embodiments of the present invention are directed to a computer-implemented method for software development collaboration among multiple developers working on a common computer program code and that avoids conflicts before code is committed to a version control system. A non-limiting example of the computer-implemented method includes uploading, by a first instance of an integrated development environment (IDE), a first source-code change to a change log of a version control system. A second instance of the IDE is used to upload a second source-code change to the change log of the version control system. A determination is made that the second source-code change conflicts with the first source-code change. Based on the determination that the second source-code change conflicts with the first source-code change, a notification of the second source-code change is generated in the first instance of the IDE.

Embodiments of the present invention are directed to a system for software development collaboration among multiple developers working on a common computer program code and that avoids conflicts before code is committed to a version control system. A non-limiting example of the system includes a first integrated development environment (IDE) instance, a second IDE instance, and a version control system. The version control system is communicatively coupled to the first instance of the IDE and the second instance of the IDE, wherein the version control system performs a method that includes uploading, by the first instance of the IDE, a first source-code change to a change log of a version control system. The second instance of the IDE is used to upload a second source-code change to the change log of the version control system. A determination is made that the second source-code change conflicts with the first source-code change. Based on the determination that the second source-code change conflicts with the first source-code change, a notification of the second source-code change is generated in the first instance of the IDE.

Embodiments of the invention are directed to a computer program product for software development collaboration among multiple developers working on a common computer program code and that avoids conflicts before code is committed to a version control system. The computer program product includes a computer readable storage medium having program instructions embodied therewith. The program instructions are executable by a processor to cause the processor to perform a method. A non-limiting example of the method includes uploading, by a first instance of an integrated development environment (IDE), a first source-code change to a change log of a version control system. A second instance of the IDE is used to upload a second source-code change to the change log of the version control system. A determination is made that the second source-code change conflicts with the first source-code change. Based on the determination that the second source-code change conflicts with the first source-code change, a notification of the second source-code change is generated in the first instance of the IDE.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts an example source-code;

Figure 1:
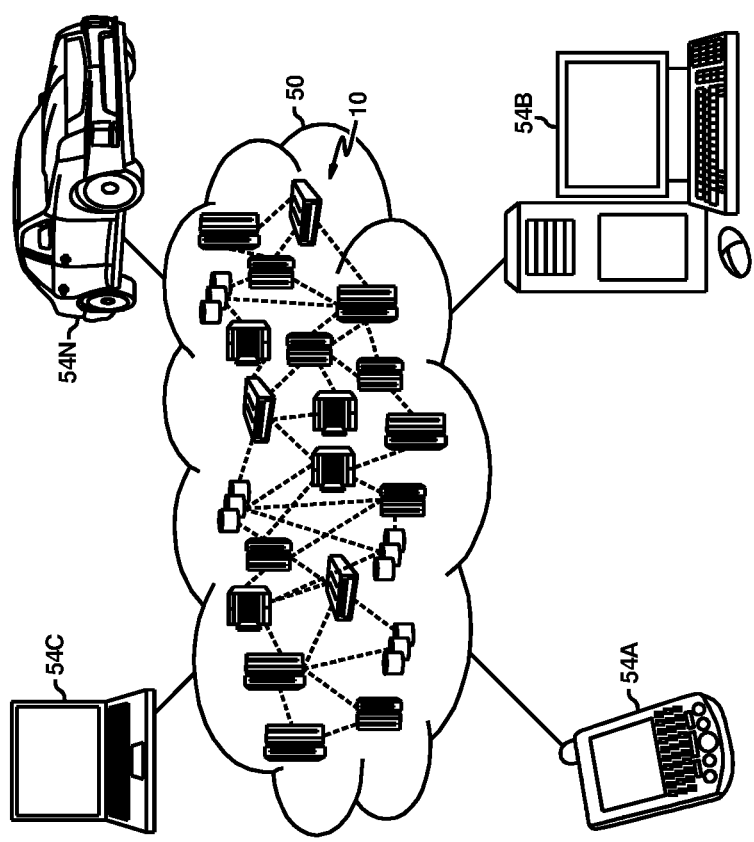
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Commercially available VCS software tools can be used to assist the software development process when multiple developers are working to develop the same source-code. A technical challenge with known source-code VCS tools arises when two or more developers attempt to make changes to the same source-code at substantially the same time. In known VCS tools, a known approach to addressing this problem is it allow only the first changes to be pushed to the VCS tool to be admitted, and the subsequent changes are rejected if they contradict the first ones. As used herein, "push" refers to incorporating changes in the master branch in the version control system, and "commit" refers to saving changes in a local repository, without "pushing" such changes to the VCS.

Known VCS tools use the concept of branches, wherein a master branch is where the code is typically merged. A developer usually copies the master branch (i.e., download the source-code on a local machine), makes changes, either on the master branch or by creating a new branch that is eventually merged into the master branch. The developer has to push the changes to the VCS for the changes to take effect in the master branch and have the changes available for another developer to access.

Meanwhile, if between the copy and the push from the developer another developer makes changes to the master branch that contradict the changes the first developer made, the first developer is not able to push his/her changes until those conflicts are resolved manually. Accordingly, the technical challenges addressed by one or more embodiments of the present invention include that the present VCS tools do not provide automated conflict resolution functionality, which means that code conflicts are not discovered much until later in the software development process.

One or more embodiments of the present invention address such technical challenges by notifying developers of such conflicts while a developer is making changes to his/her local code itself, and prior to the developer attempting to push the code into the VCS. Additionally, one or more embodiments of the present invention facilitate such notification even when the other developer (that is making conflicting changes) has not pushed his/her code into the VCS.

A typical scenario in programming is that changes being made in one file can impact source-code in that file as well as in other files in which the original file, for instance, is imported. One or more embodiments of the present invention address such technical challenges by detecting if a change being made by a first developer affects the code changes being made by a second developer. The change being made by the first developer can be in a first source-code file, while the change being made by the second developer can be in a second (separate) source-code file. Embodiments of the present invention accordingly, can notify the developers in such a case.

Moreover, even within the same file, not all changes being made by separate developers may create a conflict. In one or more embodiments of the present invention if changes made by the first developer do not impact those being made by the second developer, even within the same file, then no notification is provided to the second developer.

Accordingly, among several differences between one or more embodiments of the present invention and collaborative document management systems, some notable ones include that such systems do not have the ability to detect conflicts when developers are developing independently. One or more embodiments of the present invention do not target collaborative programming on the same file, rather, they facilitate each developer to be working independently on same and/or separate files, without causing hidden conflicts to other developer or experience inflicted by other developers. Accordingly, one or more embodiments of the present invention facilitate an IDE (integrated development environment) that the developer can use locally on his/her machine and keep him/her informed at all time about the changes that one or more collaborators made and those that can conflict with the changes s/he is making.

One or more embodiments of the present invention facilitate closer collaboration among developers, as at any given point in time, a developer can determine who is modifying the same code that s/he is changing (not just same file). One or more embodiments of the present invention further facilitate conflict avoidance, where any conflict that may arise during the changes is substantially immediately revealed to the developers (before the developers attempt to push the code), and hence no manual intervention would be needed later to solve conflicts.

One or more embodiments of the present invention is rooted in computing technology, particularly software development. One or more embodiments of the present invention improve existing solutions of VCSs. Existing solutions do not give developers the means to detect conflict in early stages, before pushing (or committing) code into the central version control system repository. Existing solutions also do not allow developers to know who is changing the same source-code, substantially simultaneously. One or more embodiments of the present invention provide technical solutions to at least such technical challenges and further advantages provided will be evident from the description that follows.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
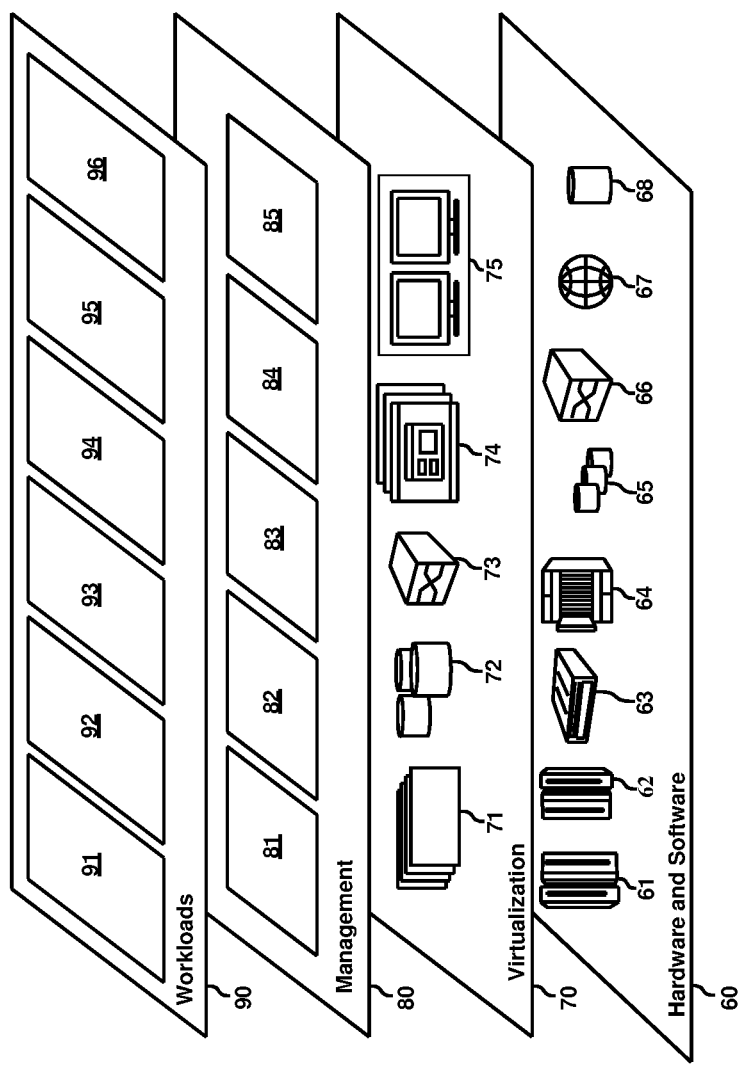
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing version control for source-code 96.

Figure 3:
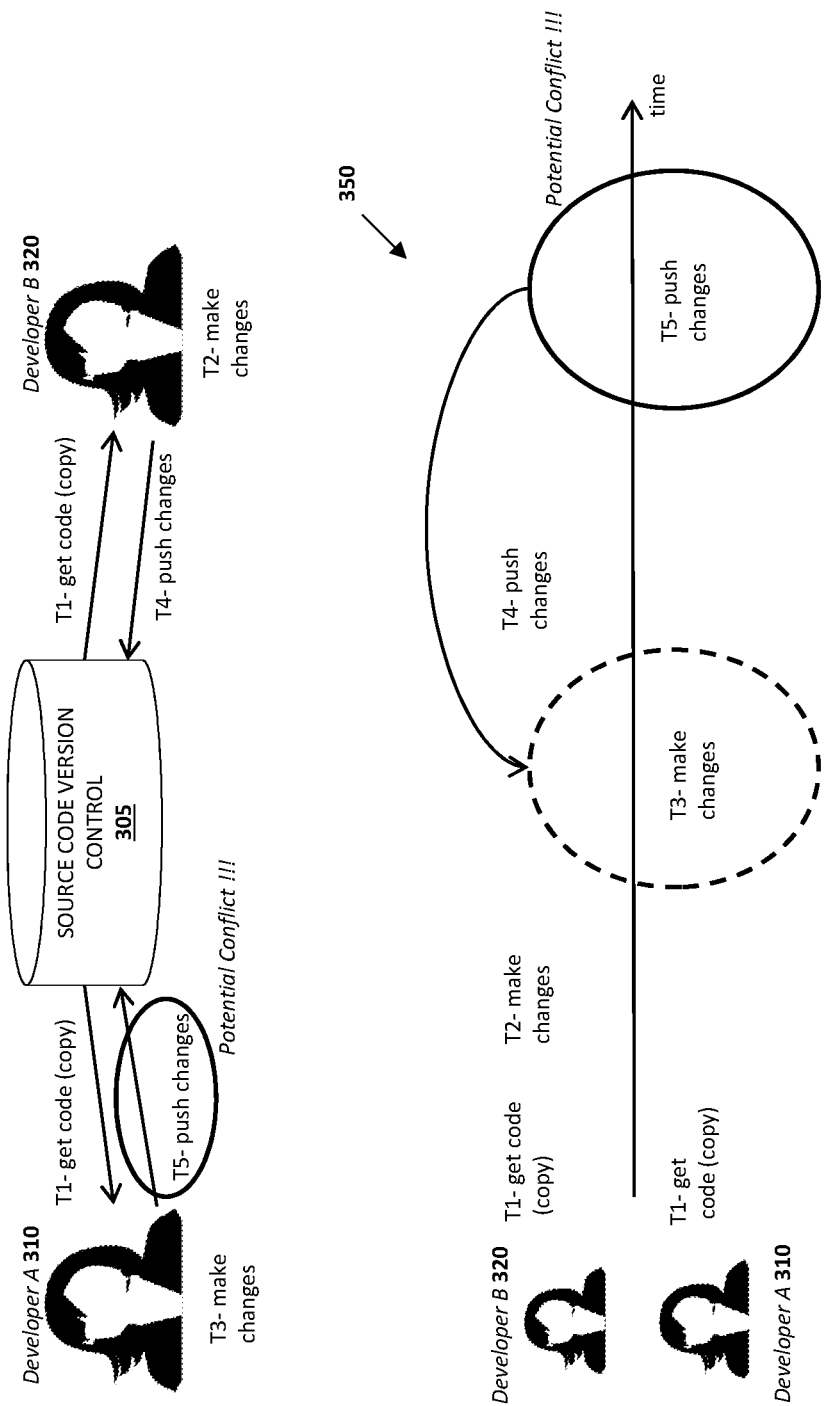
FIG. 3 depicts a block diagram of an existing system for software development collaboration.

FIG. 3 depicts a diagram of a system for software development collaboration and an operational flow and timing diagram 350 illustrating interactions among one or more depicted blocks. The depicted interactions include operations performed by a first developer (Developer A) 310 and a second developer (Developer B) 320 when using a VCS 305. The first developer 310 copies at least a portion of source-code from a master branch from the VCS 305 at time T1. At substantially the same time T1, the second developer 320 also copies the same portion of source-code. At time T2, the second developer 320 makes changes to the source-code, and at time T3 (T3>T2), the first developer 310 makes changes to the source-code. The changes are made independently. Further, the second developer 320 pushes his/her changed source-code into the VCS 305 at time T4. The first developer 310 attempts to push his/her changed source-code into the VCS 305 at time T5 (T5>T4), however, the VCS 305 at time T5, raises a conflict and rejects the push from the first developer 310. The first developer 310 has to manually determine any conflicts in the changed source-code that s/he is attempting to push and rework on the source-code in this manner. The timing diagram depicts the above operations in a time-line manner.

FIG. 4 depicts an example source-code 400 that prints the factors of a randomly selected number between 1 and 101. The depicted source-code is written in the Python programming language, however, it is understood that one or more embodiments of the present invention are not limited to the programming language or the particular function used as illustration in this case.

For ease of the reader, Python makes use of indentation to mark blocks of code. To indicate a block of code in Python, each line of the block has to be indented by the same amount. For instance, in FIG. 4, the code in lines 7 and 16 are two separate code blocks. In some examples, an indicator, such as a vertical line is shown to indicate a "block of code".

Consider the existing system of FIG. 3 and that the developer A 310 changes the code 400 by adding a new function, for example, to the code 400, and pushes that change. Then, if developer B 320 subsequently changes the source-code file by adding another new function that has nothing to do with the previously added function by developer A 310 and tries to push the changes, s/he will get an error indicating a conflict that must be resolved.

Further, in the existing system of FIG. 3, consider that the "random" library changes meanwhile, i.e. someone changes the code for the "random" library, in a separate source-code file that contains the code for that library, and for example, removes the randint( ) function. Although such a change causes the example code to have a fault, causing a compilation error for trying to use a function that does not exist, the VCS 305 cannot notify the first developer 310 that someone else has already changed the imported "random" file. Avoiding the above problems would require knowledge of code blocks, imports, function signatures, etc.

Figure 5:
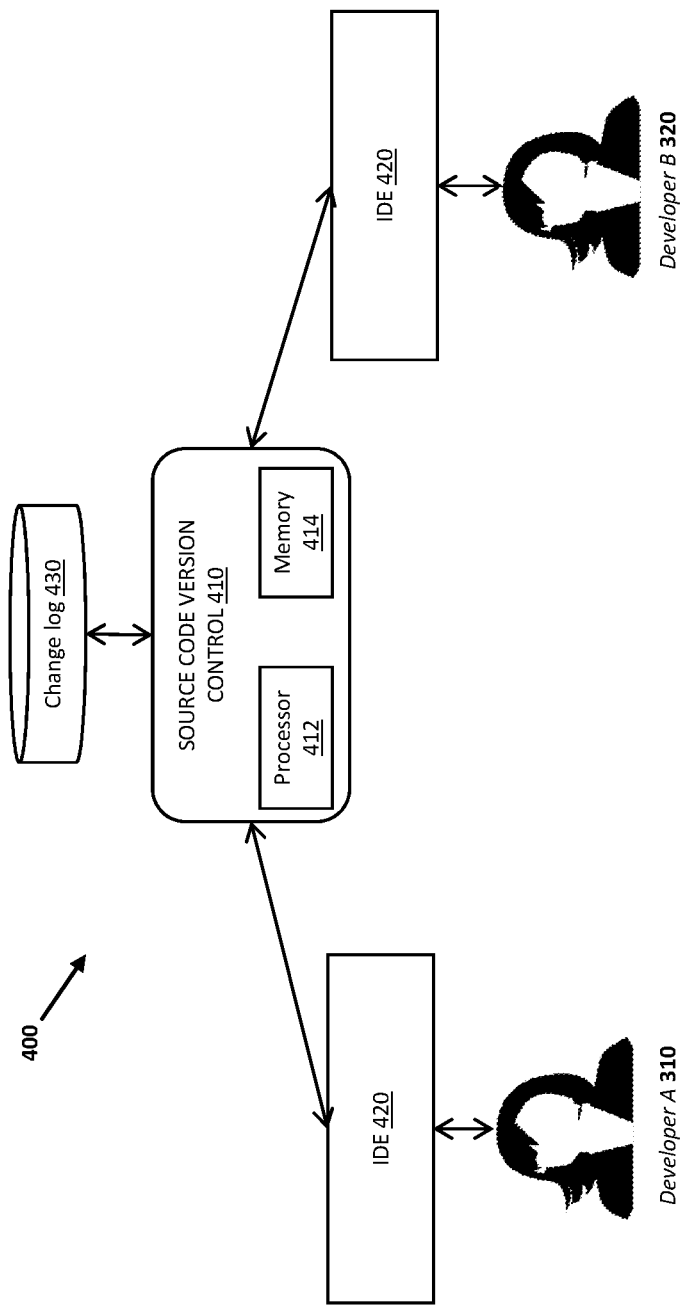
FIG. 5 depicts a block diagram of a system for software development collaboration that avoids conflicts before committing code according to one or more embodiments of the present invention.

FIG. 5 depicts a block diagram of a software development collaboration system 400 that avoids conflicts before committing code according to one or more embodiments of the present invention. In accordance with aspects of the invention, the system 400 includes a VCS 410, a change log 430, and multiple instance of an IDE 420, configured and arranged as shown. It is understood that the functional blocks of system 400 are for ease of describing the functionality of the system 400 and need not be implemented in practice as separate components. Additionally, some or all of the functionality of the system 400 can be implemented by the cloud computing environment 50 (shown in FIG. 1) and/or one or more of the cloud computing nodes 10 (shown in FIG. 1). As shown in FIG. 5, the VCS 410 addresses the above described technical challenges and facilitates early detection of source-code changes that cause conflicts. The VCS 410 further facilitates detection of changes that cause compilation errors but does not conflict at the time of pushing the code into the VCS 410. In one or more examples, the VCS 410 includes one or more processors 412 and one or more memory devices 414 to facilitate the source-code analysis. The source-code analysis can include parsing the source-code, determining dependence between one or more source-code files (e.g. based on header inclusion, configuration files etc.), determining dependence between one or more code blocks in the same source-code file, and the like.

In embodiments of the invention, the VCS 410 implements one or more IDE instance 420. The VCS 410 uses a change log 430, in one or more examples.

The IDE instance 420 serves as a developer tool that enhances team collaboration by keeping the developers informed about the changes that other developers have made and that cause conflicts or errors, even before the developer pushes the code into the VCS 410. This is achieved by the VCS 410 having the ability to store information provided to it by the IDE instance 420, and in turn to send such information to other instance(s) of IDEs 420 that are requesting it. In addition, the IDE instance 420 has the ability to upload source-code changes made by the developer to the VCS 410, the upload performed without an explicit push from the developer. Additionally, the IDE instance 420 has the ability to download the latest changes made by other developers to relevant source-code files from the VCS 410.

Figure 6:
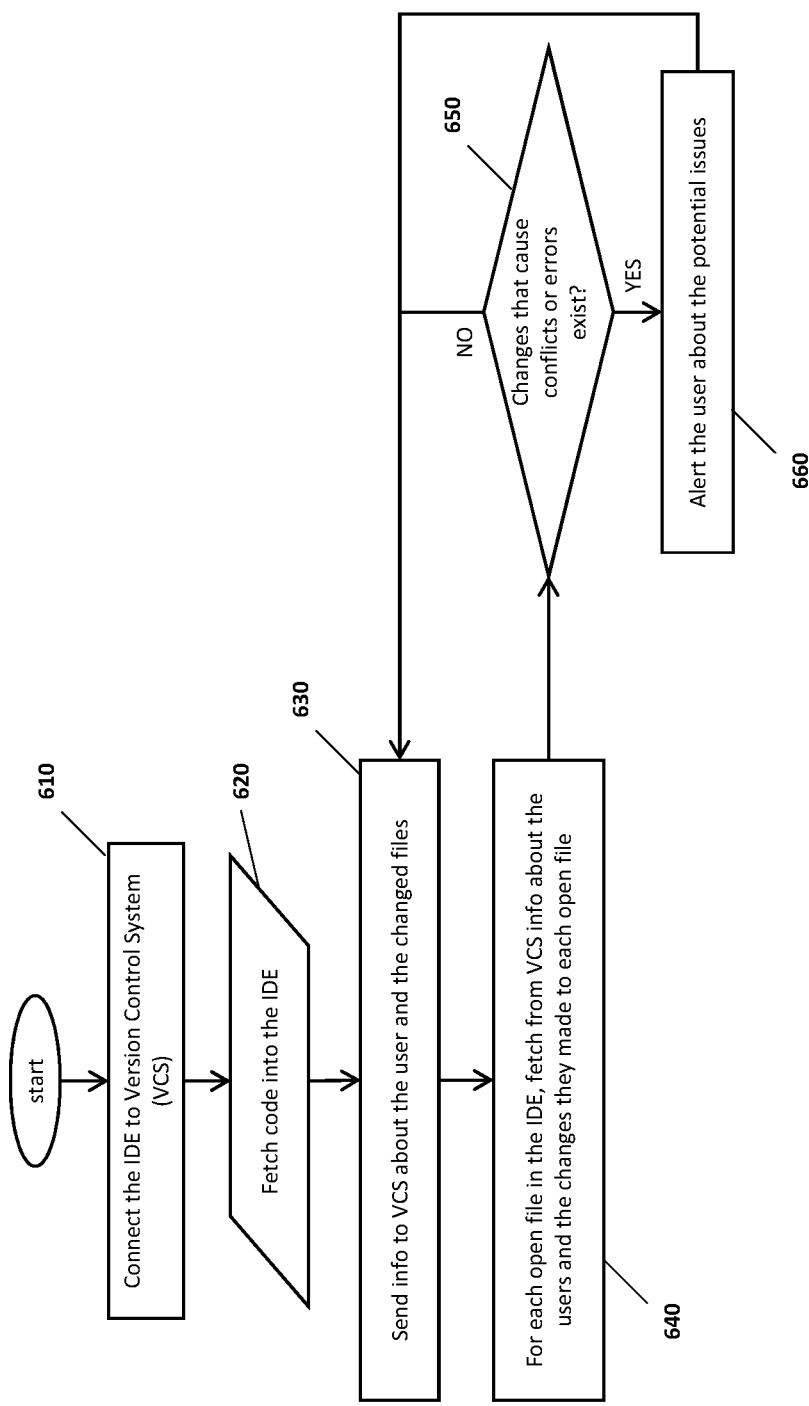
FIG. 6 illustrates a workflow of the IDE according to one or more embodiments of the present invention.

FIG. 6 illustrates a workflow of the IDE according to one or more embodiments of the present invention. When the IDE instance 420 is started, the IDE instance 420 is connected to the VCS 410 using credentials of the developer that is using the IDE instance 420 (610). Consider that the first developer 310 starts an instance of the IDE instance 420, s/he can fetch the source-code from the VCS 410, for example, by copying a specific repository (620). The IDE instance 420 keeps track of the source file(s) that is (are) open within the IDE instance 420, for example, in separate tabs, windows, and the like within an user interface of the IDE instance 420. For each open file, as soon as the first developer 310 makes a change, the IDE instance 420 sends the change that is made to the VCS 410 (630). It should be noted that the IDE instance 420 sends the change to be uploaded to the change log 430 maintained by the VCS 410, and that this is not a "push" operation that causes the master branch to be modified. The IDE instance 420 also fetches a list of changes made by other developers, including by the second developer 320, where the changes affect the code in the open file (640). The list is used to track changes made and by which user. If changes that are made by the other developers can cause a conflict or errors, the IDE instance 420 notifies the first developer 310 with this information (650, 660).

Figure 7:
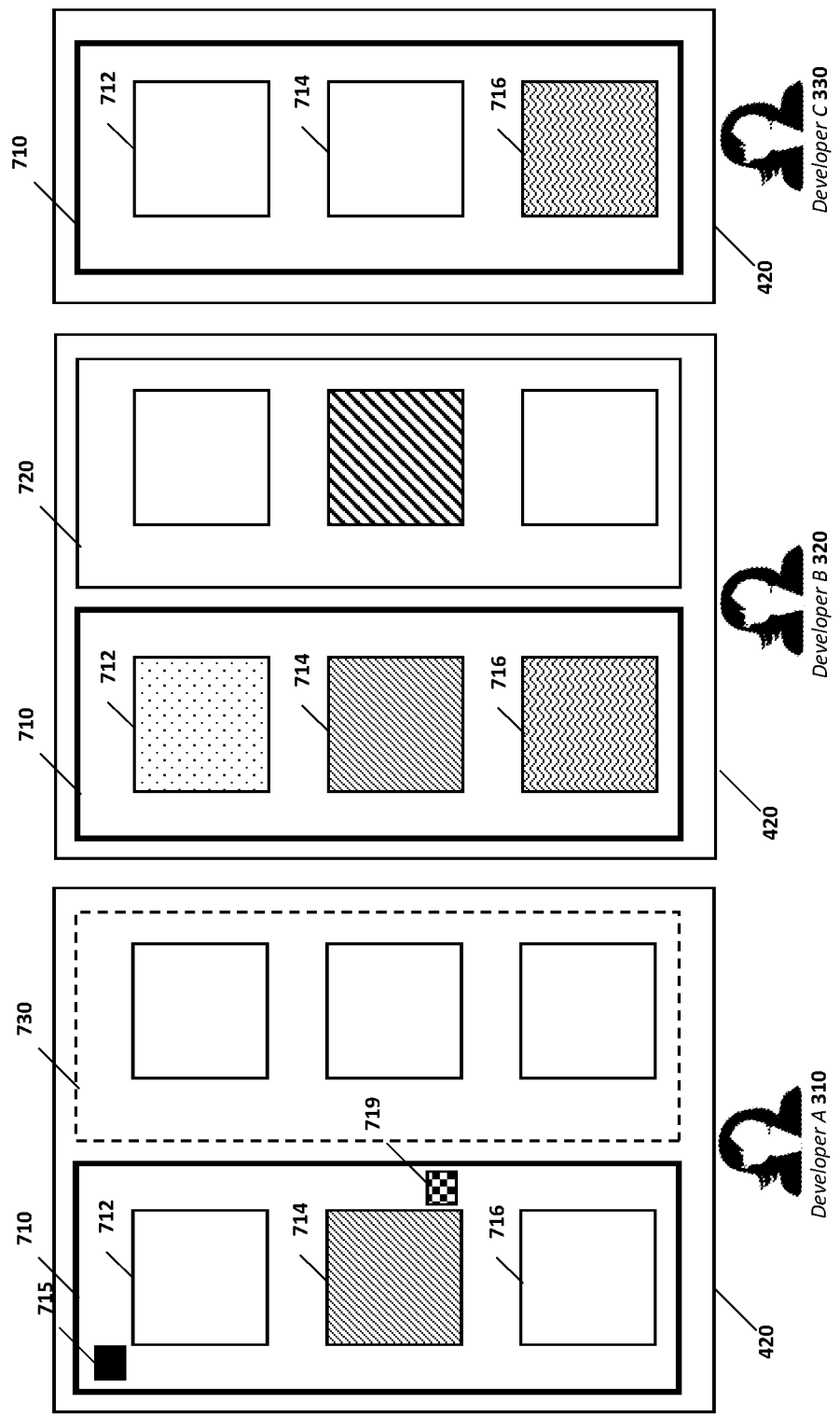
FIG. 7 depicts a block diagram of views of multiple developers using according to one or more embodiments of the present invention.

FIG. 7 depicts a block diagram of views of multiple developers using according to one or more embodiments of the present invention. The block diagram is based on an example scenario where three instances of the IDE instance 420 are being used by corresponding developers, the first developer 310, the second developer 320, and a third developer 330. Further, the first developer 310, the second developer 320, and the third developer 330, are substantially simultaneously editing independent copies of a first source-code file 710. Consider that the second developer 320 and the third developer 330 have already downloaded the first source-code file 710 and are working on the source-code independently.

As soon as the first developer 310 opens the first source-code file, a multi-developer indication 715 is generated and displayed (or otherwise communicated) to allow the first developer 710 to know who else is working on this first source-code file 710. As described earlier, a source-code file can have multiple blocks/portions. In the depicted example, the first source-code file 710 is shown with three blocks a first block 712, a second block 714, and a third block 716. Consider that the first developer 310 makes changes only to the second block 714, which is denoted by shading in block 714, the second developer makes changes to all three blocks 712, 714, and 716, and the third developer 330 makes changes only to the third block 716.

Accordingly, the first developer 310 receives an indication 719, in the IDE instance 420, that the change s/he is making in the second block 714 is in conflict with changes being made by the second developer 320. Note that notifications corresponding to the changes being made to the first block 712 and the third block 716 by the second developer 320 and/or the third developer 330 are not shown/indicated to the first developer 310 at this time. The IDE instance 420 can avoid displaying extra information in this manner, as changes made to the first block 712 and the third block 716 are determined as irrelevant to the changes to the second block 714. In other words, only relevant changes made by other developers are detected and the IDE instance 420 provides notification(s) 719 about the relevant changes in this manner. The first developer 310, in one or more examples, can select to see other changes, in other portions on which the first developer 310 is not working. The notification 719 can include an icon, a text color, a background color, an outline, or any other such visual notification associated with the source-code 714 that is in conflict. Further yet, in one or more examples, the notification 719 can include audible notification.

In addition, the notification 719 can visually identify, to the first developer 310, three levels of changes made by other developers—changes that are made by others and not committed yet (e.g. not saved), changes that are committed but not yet pushed to the VCS 410, and changes that are already pushed to the VCS 410 since the first developer has downloaded the code. The different types of changes can be shown by presenting the notification 719 in different color, different font, different icon, and/or with any other different visual attributes for the first developer 310 to identify the type of change.

The IDE instance 420 can show the different types of changes because these changes are uploaded/sent to the VCS 410 by the IDEs 420 of the other developers, before the developers (320, 330) have pushed or committed their new source-code. The VCS 410 maintains the change log 430 (FIG. 5) that indicates which lines in each source-code file have been changed and by which developer.

Further, the IDE instance 420, via the notification 719, can notify the first developer 310 that another developer is modifying a second source-code file 720 that affects the changes being made by the first developer 310 in the first source-code file 710, and particularly in the second block 714. For example, the second developer 320 modifies a portion of the second source-code file 720 (e.g. random file that is imported by source-code 400 in FIG. 4), which is imported by the first source-code file 710 (e.g. source-code 400). The change by the second developer 320 can affect the changes that the first developer 310 is making, for example, adding the line of code #13 in the source-code 400. The VCS 410, by keeping track of the semantics of the source-code, can determine that the changes being made by the second developer 320 in the second source-code file 720 can affect the source-code that are being made to the first source-code file 710 by the first developer 310. For example, the VCS 410 identifies that the first source-code file 710 includes the source-code from the second source-code file 720, such as based on the second source-code file 710 being included in a header portion of the first source-code file 710. Accordingly, the VCS 410, via the IDE instance 420, provides the notification 719 to the first developer 310 indicative of the change being made to the second source-code file 720.

The dependence of the first source-code file 710 on the second source-code file 720 is indicated by an explicit inclusion of the second source-code file 720 ('#import' statement in line 1 of source-code 400 (FIG. 4)). However, it is understood that in other embodiments of the present invention, the dependence of the first source-code file 710 on the second source-code file 720 can be identified by the VCS 410 in any other manner, such as an implicit dependence, inclusion via a separate setting, or any other configuration that may be specific to a programming language, IDE instance 420, or any other aspect of the development process.

Further yet, the VCS 410 identifies dependence of the second block 714 on the third block 716 from the same source-code file 710, via the notification 719. For example, the VCS 410 identifies that the third block 716 affects the second block 714, if the second block 714 includes a call to a function that is defined in the third block 716. The VCS 410 can determine the dependence based on a semantic analysis of the source-code file 710. In such a case, the VCS 410 notifies the first developer 310 if the changes that the third developer is making to the third block 716 conflict with the changes that the first developer 310 is making to the second block 714, for example via notification 719.

The notifications 715 and 719 can include displaying a message window in one or more examples. Alternatively, or in addition, the notifications 715 and 719 can include changing visual representation of the source-code in the source-code files 710, 720, and/or 730. For example, the visual representation can be changed by changing font, font-style (bold, italics etc.), font-size, color, background or other such attributes or a combination thereof associated with the source-code text. Alternatively, or in addition, the visual representation can be changed by displaying one or more borders around the source-code text. Further, the notifications 715 and 719 can include displaying one or more icons. The notifications 715 and 719 can include audible notifications in one or more examples. In one or more examples the notification 715 and the notification 719 can be combined into a single notification.

Referring to FIG. 7, it can be seen that a developer can be working on multiple source-code files at the same time, for example, the first developer 310 can be working on the first source-code file 710 and a third source-code file 730. The IDE instance 420 generates notifications for the first developer 310 for each of the source-code files 710 and 730 that are opened by the first developer 310.

Accordingly, one or more embodiments of the present invention facilitate early detection of conflicts between developers' code in a shared version control environment and notifying the developer(s) accordingly. One or more embodiments of the present invention provide an improvement to computer rooted technology, particularly version control systems that are used for software development. The improvement provided include extending the functionality of such version control systems by detection of conflicts among source-code that is still being edited by different developers independently. Further, by improving the version control system to perform semantic analysis of the source-code that is being updated, one or more embodiments of the present invention can determine dependence among blocks of code and notify developers when a dependent block is being edited along with a block on which that block is dependent. Accordingly, one or more embodiments of the present invention facilitate detecting code conflicts between developers and help prevent manual conflict resolution, and in turn improves a development environment in which multiple developers collaborate to create a single software product.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source-code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
uploading, by a first instance of an integrated development environment (IDE), a first source-code change to a change log of a version control system, the first source-code change revises a first portion a source code;
uploading, by a second instance of the IDE, a second source-code change to the change log, the second source-code change revises a second portion from the same source code;
determining that the second source-code change conflicts with the first source-code change by detecting a dependence between the first portion and the second portion, the dependence indicated by a setting in the source code, the first portion being distinct from the second portion, wherein detecting the dependence further includes performing a semantic analysis of the second source-code change;
based on the determination that the second source-code change conflicts with the first source-code change, generating a notification of the second source-code change in the first instance of the IDE, wherein the version control system is configured to detect that modifications between the second source-code change and the first source-code change cause compilation errors in the absence of the conflicts;
determining, by the first instance of the IDE, that there is at least one other notification associated with changes to at least one other portion of the same source code; and
preventing, by the first instance of the IDE, display of the at least one other notification associated with the changes to the at least one other portion of the same source code based on determination of relevancy.

2. The computer-implemented method of claim 1, wherein the first portion is in a source-code file, and the second portion is in the same source-code file;
further comprising generating another notification in the first instance of the IDE, the another notification being configured for different levels of changes made by other instances of IDE distinct from the first instance of the IDE, each of the different levels of changes being associated with a different type of change, the another notification being an indication that an unsaved change has been made in but not yet saved by the second instance of the IDE.

3. The computer-implemented method of claim 1, wherein the first source-code change is in a first source-code file, and the second source-code change is in a separate second source-code file.

4. The computer-implemented method of claim 3, wherein the first source-code file is dependent on the second source-code file.

5. The computer-implemented method of claim 1, wherein the second source-code change is not saved at the second instance of the IDE; and
wherein a multi-developer indication is communicated in the first instance of the IDE upon different instances of the IDE being opened for simultaneous editing of independent copies of the source code before making the first source-code change.

6. The computer-implemented method of claim 1, wherein the second source-code change is saved locally at the second instance of the IDE but is not uploaded to the version control system.

7. The computer-implemented method of claim 1, wherein a type of the notification of the second source-code change in the first instance of the IDE is based on the second source-code change being selected from a group consisting of a change that is committed to the version control system, and a change that is saved by the second instance of the IDE but not committed to the version control system.

8. A system comprising:
a memory device; and
one or more processors coupled with the memory device, the one or more processors configured to execute a version control system that is in communication with at least a first instance of an integrated development environment (IDE), and a second instance of the IDE, wherein the version control system is configured to perform a method comprising:
receiving, from the first instance of the IDE, a first source-code change to a change log of the version control system, the first source-code change revises a first portion a source code;
receiving, from the second instance of the IDE, a second source-code change to the change log, the second source-code change revises a second portion from the same source code;
determining that the second source-code change conflicts with the first source-code change by detecting a dependence between the first portion and the second portion, the dependence indicated by a setting in the source code, wherein detecting the dependence further includes performing a semantic analysis of the second source-code change;
based on the determination that the second source-code change conflicts with the first source-code change, generating a notification of the second source-code change in the first instance of the IDE, wherein the version control system is configured to detect that modifications between the second source-code change and the first source-code change cause compilation errors in the absence of the conflicts; and
generating another notification in the first instance of the IDE, the another notification being configured for different levels of changes made by other instances of IDE distinct from the first instance of the IDE, the another notification being an indication that an unsaved change has been made in but not yet saved by the second instance of the IDE
determining that there is at least one other notification associated with changes to at least one other portion of the same source code; and
preventing display of the at least one other notification associated with the changes to the at least one other portion of the same source code based on determination of relevancy.

9. The system of claim 8, wherein the first source-code change is in a first source-code file, and the second source-code change is in a second source-code file, wherein the first source-code file is dependent on the second source-code file.

10. The system of claim 8, wherein the second source-code change is not saved at the second instance of the IDE.

11. The system of claim 8, wherein the second source-code change is saved at the second instance of the IDE but not uploaded to the version control system.

12. The system of claim 8, wherein a type of the notification of the second source-code change in the first instance of the IDE is based on the second source-code change being selected from a group consisting of a change that is committed to the version control system, a change that is saved by the second instance of the IDE but not committed to the version control system, and a change that is not yet saved by the second instance of the IDE.

13. A computer program product comprising a computer readable storage medium having program instructions embodied therewith, the program instructions executable by a processing circuit to cause the processing circuit to perform a method to avoid conflicts before committing code comprising:
uploading, by a first instance of an integrated development environment (IDE), a first source-code change to a change log of a version control system, the first source-code change revises a first portion a source code;
uploading, by a second instance of the IDE, a second source-code change to the change log, the second source-code change revises a second portion from the same source code;
determining that the second source-code change conflicts with the first source-code change by detecting a dependence between the first portion and the second portion, the dependence indicated by a setting in the source code, wherein detecting the dependence further includes performing a semantic analysis of the second source-code change;
based on the determination that the second source-code change conflicts with the first source-code change, generating a notification of the second source-code change in the first instance of the IDE, wherein the version control system is configured to detect that modifications between the second source-code change and the first source-code change cause compilation errors in the absence of the conflicts;
determining that there is at least one other notification associated with changes to at least one other portion of the same source code; and
preventing display of the at least one other notification associated with the changes to the at least one other portion of the same source code based on determination of relevancy.

14. The computer program product of claim 13, wherein the first portion is in a source-code file, and the second portion is in the same source-code file;
further comprising generating another notification in the first instance of the IDE, the another notification being configured for different levels of changes made by other instances of IDE distinct from the first instance of the IDE, each of the different levels of changes being associated with a different type of change, the another notification being an indication that an unsaved change has been made in but not yet saved by the second instance of the IDE.

15. The computer program product of claim 13, wherein the first source-code change is in a first source-code file, and the second source-code change is in a second source-code file, wherein the first source-code file is dependent on the second source-code file.

16. The computer program product of claim 13, wherein the second source-code change is not saved at the second instance of the IDE.

17. The computer program product of claim 13, wherein the second source-code change is saved at the second instance of the IDE but is not uploaded to the version control system.

18. The computer-implemented method of claim 1, wherein the dependence is indicated by an inclusion of an identifier of the first portion in the second portion.

19. The computer-implemented method of claim 1, wherein the dependence is indicated by an inclusion of one or more source code elements of the first portion in the second portion.

20. The computer-implemented method of claim 1, further comprising providing a selection as an opportunity for a user to choose to view the at least one other notification associated with the changes to the at least one other portion of the same source code thereby overriding the determination of relevancy.

\* \* \* \* \*